No. 807,111. PATENTED DEC. 12, 1905.
H. H. CUMMINGS.
TACKING MACHINE.
APPLICATION FILED FEB. 21, 1900.

5 SHEETS—SHEET 1.

Witnesses:
Arthur G. Randall
Oscar F. Hill

Inventor:
Henry H. Cummings
by MacLeod Calver & Randall
Attorneys.

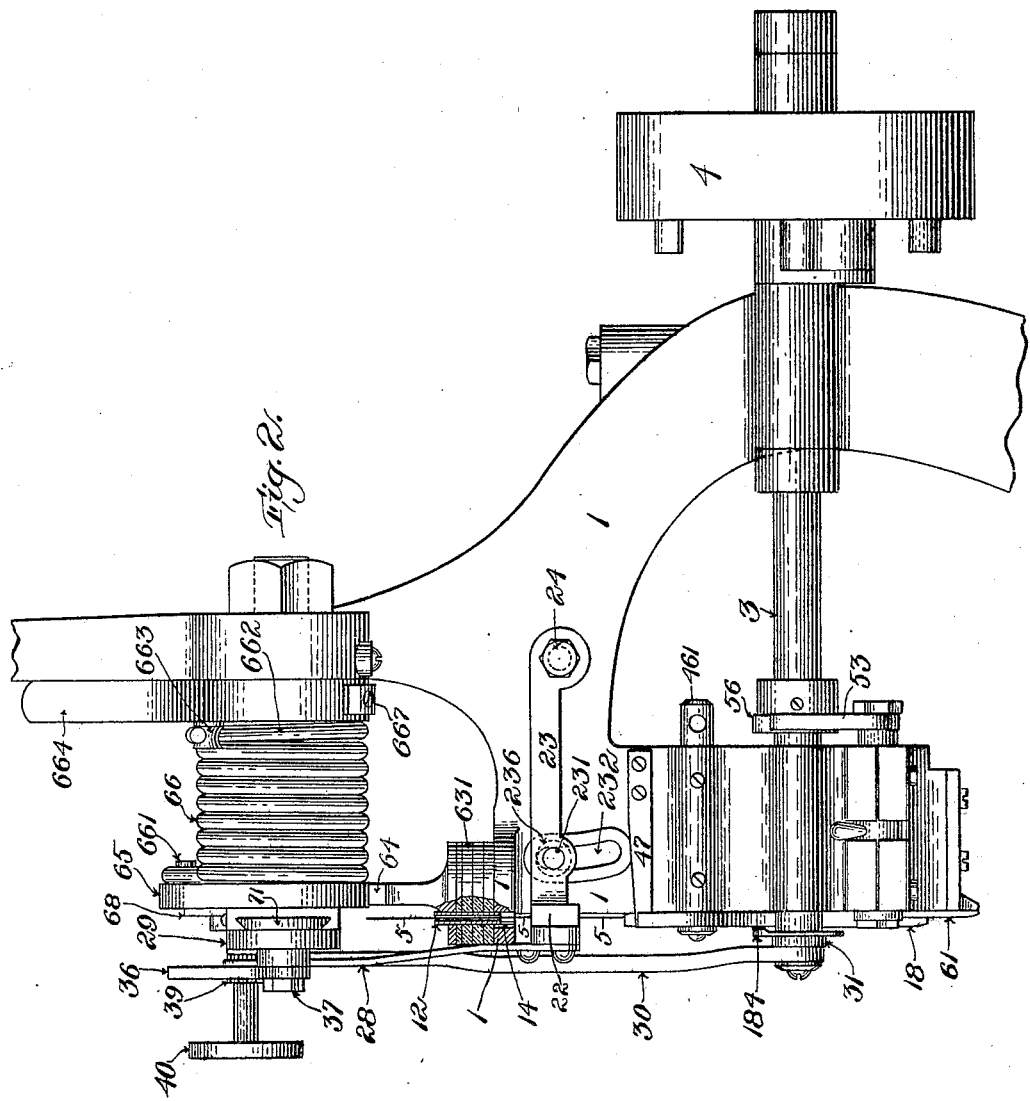

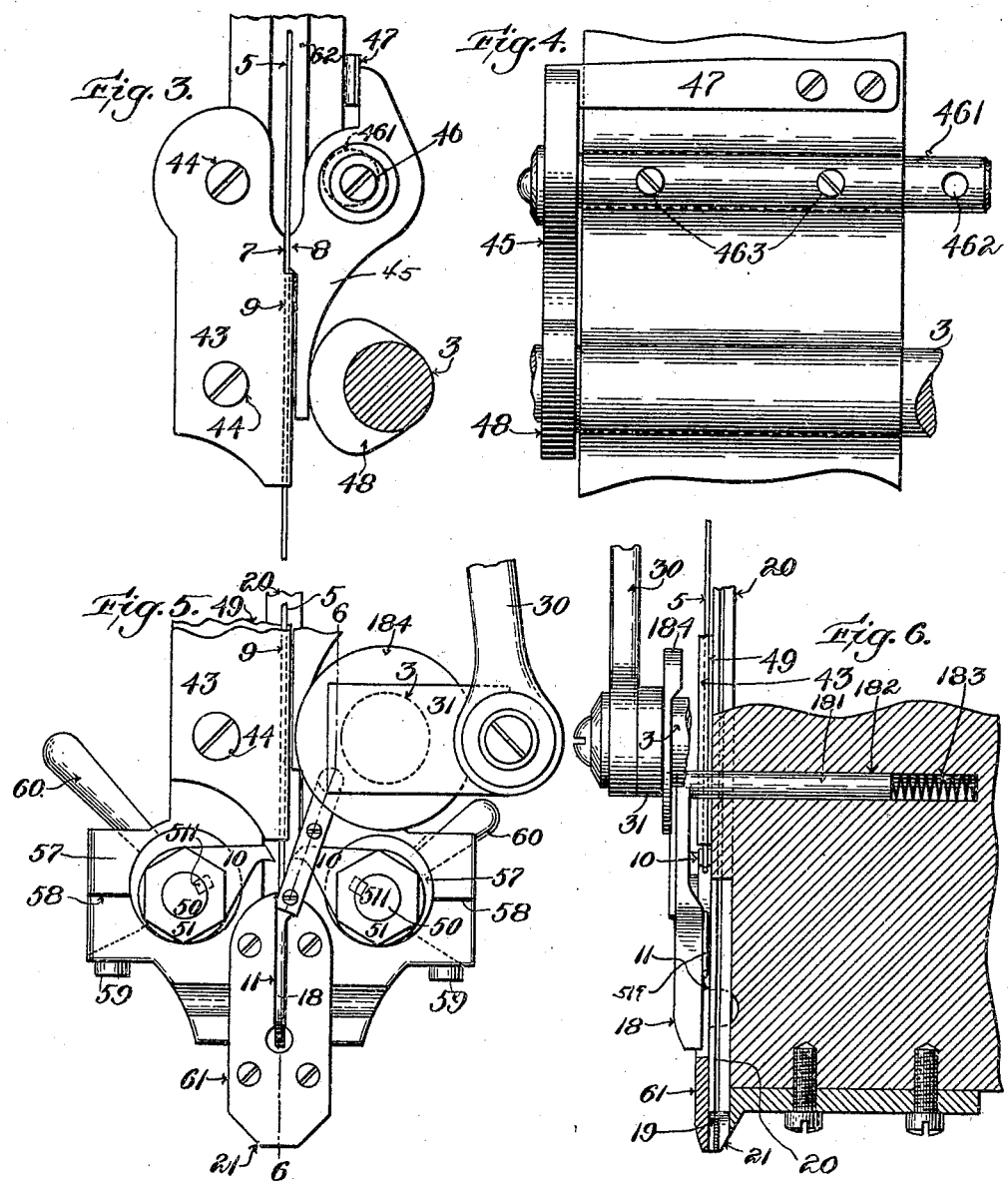

No. 807,111. PATENTED DEC. 12, 1905.
H. H. CUMMINGS.
TACKING MACHINE.
APPLICATION FILED FEB. 21, 1900.
5 SHEETS—SHEET 4.
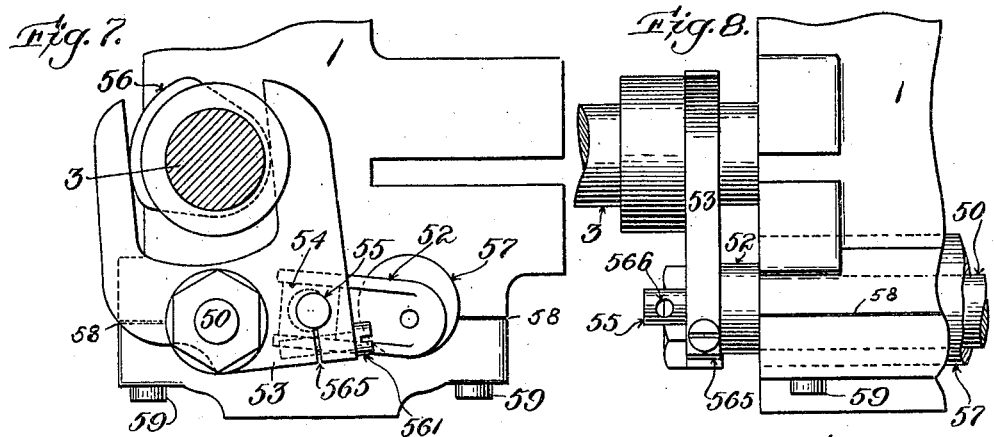
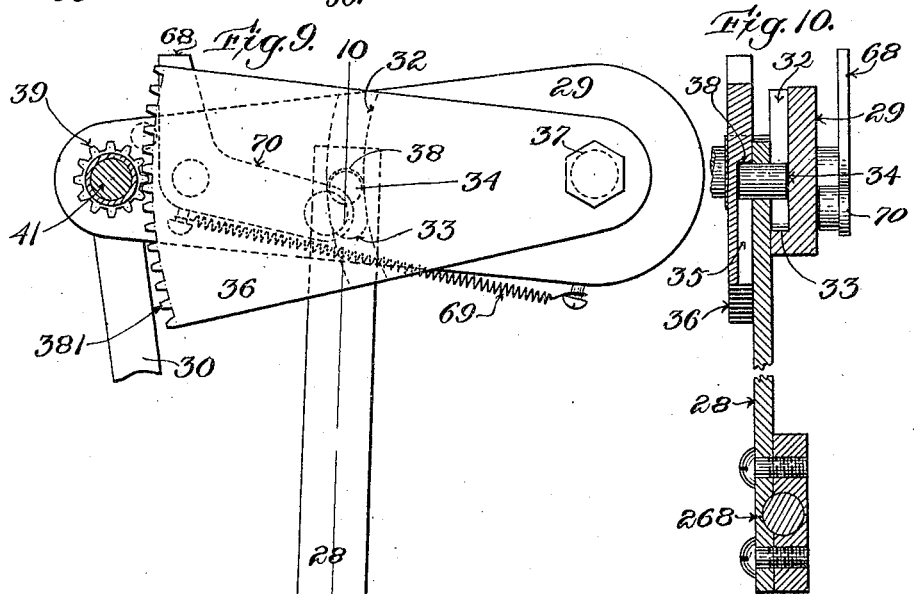
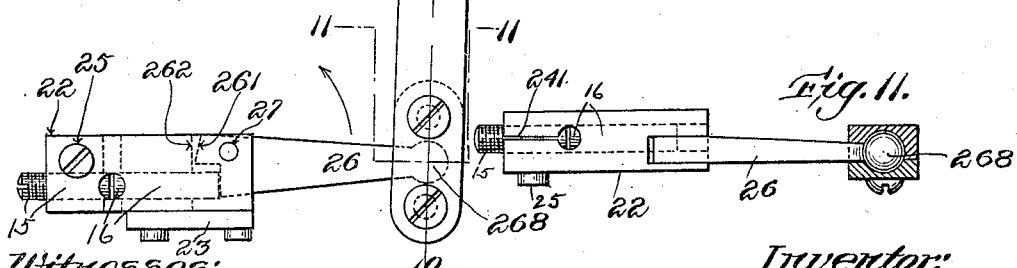
Witnesses:
Oscar F. Hill
Edith J. Anderson
Inventor:
Henry H. Cummings
by Macleod Calver & Randall
Attorneys.

No. 807,111. PATENTED DEC. 12, 1905.
H. H. CUMMINGS.
TACKING MACHINE.
APPLICATION FILED FEB. 21, 1900.

5 SHEETS—SHEET 5.

Witnesses:
Alice H. Morrison
J. Henry Parker

Inventor:
Henry H. Cummings
by
Macleod Calver Cushman & Dike
Attorneys.

UNITED STATES PATENT OFFICE.

HENRY H. CUMMINGS, OF MALDEN, MASSACHUSETTS, ASSIGNOR, BY MESNE ASSIGNMENTS, TO JAMES H. CUTTEN, OF BOSTON, MASSACHUSETTS.

TACKING-MACHINE.

No. 807,111.     Specification of Letters Patent.     Patented Dec. 12, 1905.

Application filed February 21, 1900. Serial No. 6,007.

*To all whom it may concern:*

Be it known that I, HENRY H. CUMMINGS, a citizen of the United States, residing at Malden, in the county of Middlesex, State of Massachusetts, have invented a certain new and useful Improvement in Tacking-Machines, of which the following is a specification, reference being had therein to the accompanying drawings.

My invention consists in an improved tacking-machine more especially designed for use in the manufacture of boots and shoes and by means of which wire in a continuous length automatically is fed forward by movements of predetermined or measured extent, portions being detached therefrom successively and formed into tacks, and the latter being driven.

The invention will be described first with reference to the accompanying drawings, in which latter I have illustrated the best embodiment thereof which I have yet contrived, after which the distinguishing characteristics of the invention will be particularly pointed out and distinctly defined in the claims at the close of this specification.

Figure 1:
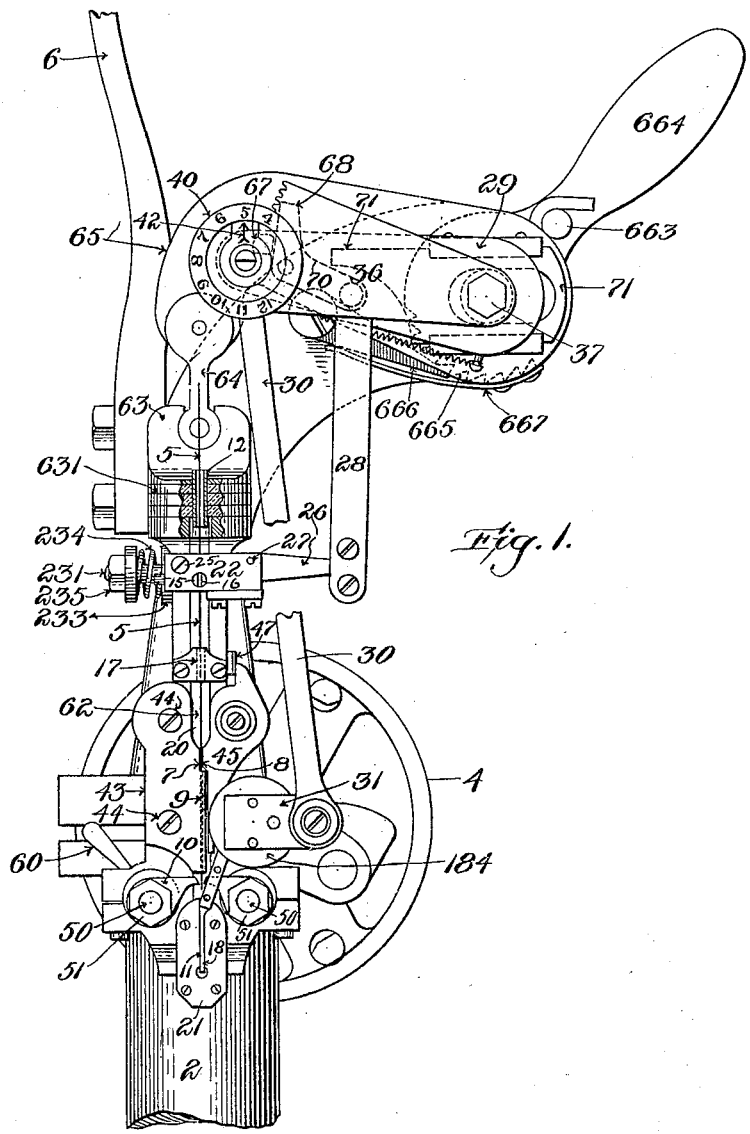
Figures 12, 13:
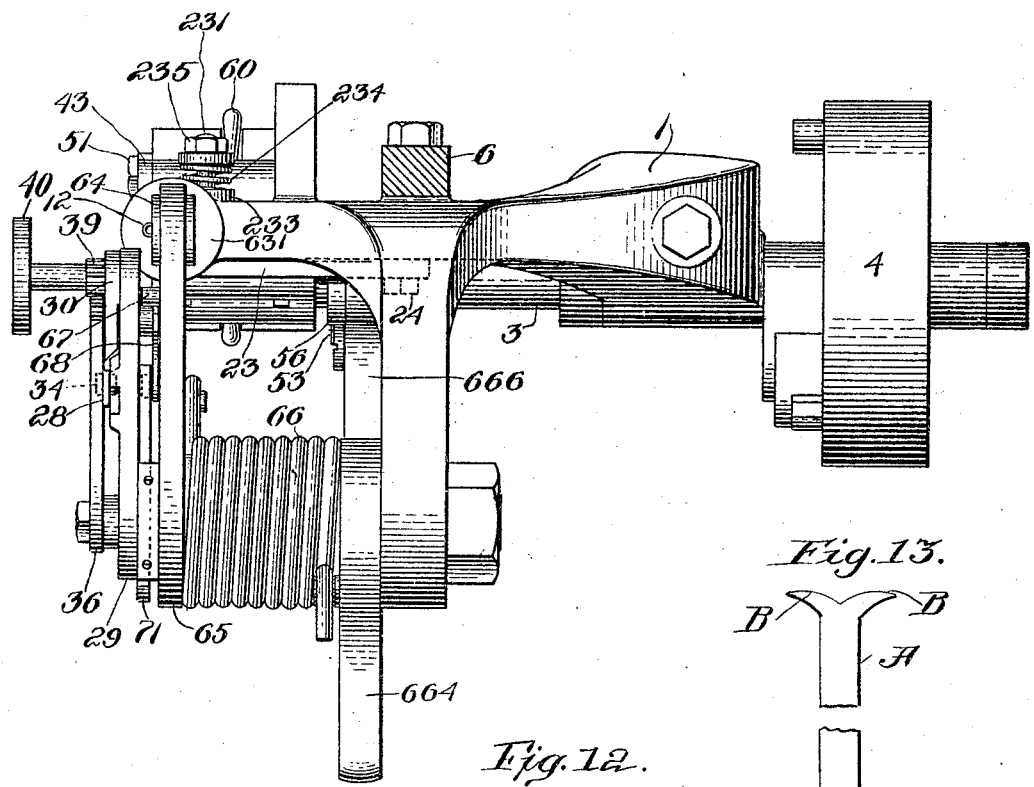

In the drawings, Figure 1 is a view in front elevation of a tacking-machine embodying my present invention, the standard or support of the machine being in large part broken away or omitted to save space. Fig. 2 is a view in side elevation of the parts which are shown in Fig. 1. Fig. 3 is a view in front elevation, partly sectional, of the devices for gripping and holding the wire. Fig. 4 is a view in side elevation of the parts which are represented in Fig. 3. Fig. 5 is a view in front elevation of the cutters and the parts which are adjacent thereto. Fig. 6 is a view showing, partly in side elevation and partly in section, the parts which are represented in Fig. 5. Fig. 7 is a view, partly in vertical section and partly in rear elevation, of the devices which are employed for actuating the cutters. Fig. 8 is a view in side elevation of the parts which are represented in Fig. 7. Fig. 9 is a view, partly in section and partly in front elevation, of the devices for feeding the wire and adjusting the extent of feed. Fig. 10 is a view in section on the dotted line 10 10, Fig. 9. Fig. 11 shows the feeding devices in plan with rod 28 in horizontal section on line 11 11, Fig. 9. Fig. 12 is a top view of a machine embodying my invention. Fig. 13 is a side elevation of a tack or nail formed by machine embodying my invention, the said tack or nail being somewhat enlarged.

1 (see more particularly Fig. 2) designates the framework supporting the various moving parts of the machine, and 2, Fig. 1, designates the post or standard on the upper end of which the said framework of the machine is mounted or located.

3 (see more particularly Fig. 2) is an operating-shaft mounted to turn in bearings in the framework 1 and having applied thereto a band-pulley, as 4, around which in practice is intended to be passed a driving-band (not shown) actuated by any suitable means. In connection with the said band-pulley 4 and the said shaft I contemplate employing in practice clutch devices, by means of which the shaft may be thrown into revolution whenever desired, as upon the actuation of a treadle, and automatic stop devices whereby the shaft will be arrested after the completion of a single rotation or revolution thereof, as customary in machines of this class. Inasmuch as devices such as have just been referred to are well known and in general use, I have omitted them from the drawings in order to secure as much simplicity and clearness in the latter as possible. From the said shaft 3 the various moving parts of the machine are actuated.

The wire is shown at 5, Figs. 1, 2, 3, 5, and 6, and in practice the same will be drawn by the machine from a reel (not shown) and which conveniently may be supported on the upper extremity of the arm or upright 6. (Partly indicated in Figs. 1 and 2.) On its way from the said reel or other source of supply the wire 5 passes through a tubular guide 12, Figs. 1 and 2, then through a hole in the projection 14 of the machine-framing, as shown in Fig. 2, then between the jaws 15 16 of the feeding device, Figs. 1 and 9, then through the guide at 17, Fig. 1, then between the holding-jaws 7 8, Figs. 1 and 3, then through the guide at 9, Figs. 1, 3, and 5, then between the working edges of the cutters 10 10, Figs. 1, 5, and 6, and the advancing end of the wire as it passes beyond the said cutters projects into the vertical slot at 11, same figures.

In the working of the machine, the feeding device being at the upper extreme of its movement, the jaws 15 16, Figs. 1 and 9, thereof are closed upon the wire so as to grip the latter, and by the advancing movement of the said feeding device in a downward direction the wire is advanced so as to cause the end thereof to project between the cutters 10 10 and beyond the latter into the slot 11 to the extent which is required for the production of a nail or tack of the required length. The extent of the advance of the wire is regulated by means of adjusting devices, which are combined with the feeding device, as is explained later herein. During the advancing movement of the wire the clamping-jaws 7 8 are freed from restraint sufficiently to permit of the movement of the wire between them in the direction of the feed. On the completion of the feed movement of the wire the clamping-jaws 7 8, Figs. 1 and 3, are closed positively upon the same, so as to hold it from movement in either direction, while the cutters 10 10 are closed upon the wire, so as to sever a nail or tack therefrom.

18, Figs. 1, 5, and 6, is a pusher working in the slot 11 and to which is given a lateral movement in the said slot after the severance of a nail or tack from the wire 5 has been effected, the said lateral movement of the pusher 18 in the slot 11 serving to shift the just-formed nail or tack into a driving-channel 19 in line with the end of a driver 20. By the descent of the said driver the said nail or tack is driven into the work, the latter being in practice held by the operator pressed up against the lower end or nose of the work-rest 21, Figs. 1, 5, and 6.

The feeding device, Figs. 1, 2, 9, 10, and 11, consists of a block 22, mounted with capacity to move vertically in the machine and provided with the jaws 15 and 16 for engagement with the wire 5. In the drawings (see more particularly Fig. 2) the said block 22 is shown as formed or mounted upon the forward extremity of an arm 23, which is hung or pivoted to the machine-framing at its rear extremity, as upon the pivotal pin or bolt 24, Fig. 2.

The jaw 15 is shown as fixed, but adjustable, while the jaw 16 is operated to compress the wire against the said fixed jaw at intervals, as required, in order to enable the feeding of the wire to be effected when the feeding device is advanced.

The fixed jaw 15 is preferably constituted by a screw, against the inner end of which the wire 5 takes a bearing, the said screw fitting a threaded hole that is tapped horizontally into the block 22. In order to prevent any accidental loss of adjustment, I provide means to lock the said screw in the position which is given to it. Thus in the present case I have formed a vertical slit or slot 241, intersecting the said threaded hole, and I employ a transversely-extending screw 25, whereby to draw together the portions of the block 22 at opposite sides of the said slit or slot and cause the screw 15 to be gripped or bound.

The movable jaw 16 is shown as constituted by a pin which is movable lengthwise within a hole that is formed for its reception in block 22, the inner end of said pin engaging with the wire 5 and the outer end thereof being in proximity to a projection or arm of a lever 26, which last is connected pivotally with block 22, as by means of a pin 27, Figs. 1 and 9. The outer end of the lever 26 has connected therewith by a universal-joint connection, as at 268, Figs. 9, 10, and 11, the lower end of a rod 28, the upper end of which is in operative connection with an arm or lever 29, the said arm or lever 29 standing at right angles to arm 23, and hence swinging in a plane at an angle to that in which the latter swings, and being in turn connected by a rod 30, Figs. 1 and 2, with the crank 31 on the front end of shaft 3. The limit of the movement of the lever 26 relatively to the block 22 in the direction (upward) which is indicated by the arrow in Fig. 9 is determined by a shoulder 261 upon the lever 26 coming into engagement with a shoulder 262 on the block.

In order to insure that the movement of the feeding device shall be resisted with sufficient force to insure the turning of the lever 26 about its pivotal connection with block 22 at each extreme of its vertical movement and to insure the firm gripping of the wire during the downward movement, whereby I insure the gripping of the wire between jaws 15 and 16 before the feeding device begins to descend, the firm engagement of such jaws with the wire during the descent of the feeding device, and also the release of the wire from compression before the feeding device begins to ascend, I combine with the feeding device a drag or friction device shown in Figs. 1 and 2 and comprising a pin 231, projecting from arm or lever 23 through a slot 232 in a part of the machine-framing 1 and receiving on the other side of the said part a washer 233, Fig. 1, a spring 234 bearing against said washer, so as to press it against the surface of the said part of the machine-framing, and a nut 235 whereby to adjust the tension of the said spring. In this manner the shoulder 236, Fig. 2, of said pin 231 and the washer 233 are held in frictional contact with opposite sides of the said part of the machine-framing.

Through the devices which have been described as intervening between the said crank 31 and the lever 26 the said lever first is turned upon the pivot 27, so as to force the movable jaw 16 against the wire 5 to cause the latter to be gripped or held against the fixed jaw 15. As soon as the inward movement of jaw 16 becomes arrested by the wire the power that is applied to lever 26 operates to depress the feeding device, thereby advancing the wire. Should the wire be absent, the contact of pin 16 with the inner end of pin 15 will be followed by the depression of the feeding device. When the lowest point in the movement of the feeding device has been reached, the change in the direction of movement of rod 28 swings the lever 26 slightly on its pivot 27, relieving the jaw 16 of pressure and releasing the wire, after which the feeding device is carried upward into its highest position in consequence of the engagement of shoulder 261 with the shoulder 262.

In order to permit the extent of the feed of the wire at each advance thereof to be regulated or varied, as is required in practice, I provide for adjustment in the actuating connections of the lever 26 and feeding device. Preferably I accomplish this by allowing lost motion to occur between the arm or lever 29 and the rod 28 and also by providing means for varying the amount of such lost motion at will. Figs. 9 and 10 of the drawings show the arm or lever 29 as having a groove 32 on one side thereof and a shoulder 33 at the lower end of such groove. Through the upper extremity of the rod 28 passes a pin 34, one end of which enters and plays in the said groove 32. When the arm 29 is swung upwardly in the working of the machine, the said shoulder 33 engages with the said end of the pin 34, and thereby causes the rod 28 to move upwardly also. The other end of the pin 34 plays in a groove 35 in an arm 36, which is pivoted concentrically with arm 29, as upon the pin or stud 37, Figs. 1 and 9, the said arm 36 being connected with arm 29, so as to cause it to move in unison therewith. The shoulder 38 at the upper end of groove 35 engages with the corresponding end of pin 34 in the descent of the arms 29 and 36, thereby causing the rod 28 to move downward.

The extent of the movement which is transmitted to the feeding device from the arms 29 and 36 corresponds to the extent of the movement of such arms at the distance from their common center at which the pin 34 becomes engaged therewith less the lost motion or play of the pin intermediate the two shoulders 33 and 38. The extent of this lost motion or play is varied in order to regulate the extent of feed as required by making an adjustment of the arm 36 with reference to the arm 29. A convenient means of connecting the arms 29 and 36 together with capacity for making this adjustment consists of a gear-segment, as at 381, upon the outer extremity of the arm 36 and the pinion 39, mounted on the arm 29, engaging the said gear-segment 381 and provided with a thumb-wheel 40, (see Figs. 1 and 2,) by means of which to rotate the same. The pinion 39 and thumb-wheel 40 are sleeved upon the fixed pin or stud 41, to which is applied the upper end of the connecting-rod 30. The face of the thumb-wheel 40 is provided with graduations or indicia, as indicated in Fig. 1, and a pointer or index 42 is secured to the outer extremity of the said stud or pin 41, so as to remain fixed or stationary when the thumb-wheel and pinion are rotated. (See Fig. 1.)

The clamping-jaw 7 is applied to or formed upon the plate 43, Figs. 1 and 3, which latter is held to the machine-framing by screws 44 44. The jaw 8 is formed upon or applied to a lever 45, Figs. 1, 3, and 4, the latter being mounted upon a pivot 46, Fig. 3, and acted upon by a spring 47, Figs. 1, 3, and 4, which operates to press the jaw 8 toward the jaw 7. For the purpose of closing the clamping-jaws at intervals upon the wire in a positive manner, so as to hold the latter from undesired movement during the action of the cutters, a cam 48, Figs. 3 and 4, is mounted upon the shaft 3 and engages with the tail of the lever 45. The said cam may be caused to hold the wire clamped during the early part of the upward movement of the feeding device, and also its action upon the movable clamp may be continued as far during such upward movement as may be deemed desirable. It is intended that the tension and power of the spring 47 shall be sufficient to hold the movable jaw compressed toward the fixed jaw with enough force to hold the wire from undesired movement during the time when the cam 48 is not operating the movable jaw.

For the purpose of effecting adjustment of the jaws 7 and 8 with reference to each other to suit the gage of the wire being operated upon and for other reasons I employ by preference an eccentric mounting for the pivot 46. To this end I form the pivot 46 on the front end of a short shaft 461, which is fitted to a hole in the machine-framing 1, and dispose the said pivot eccentrically with respect to the axis of the said short shaft. This enables me by occasioning a rotary adjustment of the shaft 461 to effect the desired adjustment of the clamping-jaw 8 with relation to the jaw 7. For convenience in rotating shaft 461 I cause the rear end thereof to project, as in Fig. 4, and form a hole 462 therethrough for the reception of a pin or the like by which to effect the rotation of the shaft. To hold the shaft and pivot after adjustment, I employ one or more clamping-screws 463 463, Fig. 4.

The guide at 9 consists of a groove on the rear side of the plate 43, as indicated in Figs. 3 and 5, and preferably in practice a thin plate 49 is applied behind the plate 43, so as to constitute a cover for the groove just mentioned, the said plate lying in front of the shank or stem of the driver, presently to be described, and holding the wire out of contact with the said stem or shank. The chief purpose of the plate 49 is to prevent the wire from becoming displaced toward the rear relatively to the cutters, which might operate to prevent the latter from severing the wire completely or perfectly.

The cutters 10 10, Figs. 1 and 5, consist of small arms having their working extremities proximate to each other on opposite sides of the line of movement of the wire 5. The said arms are mounted on the reduced forward ends of short parallel shafts 50 50, being clamped against shoulders on the said shafts by means of nuts 51 51, suitable keys 511 511 being provided to insure proper position of cutters. Upon the rear ends of the said shafts 50 50 are fixed arms 52 53, Fig. 7, one on each shaft, the arm 52 being slotted radially for the reception of a sliding block 54, which is shown in dotted lines in Fig. 7, and the arm 53 being provided with a pin 55, entering a hole in said block. The arm 53 is formed or provided also with a fork fitting a cam 56 on the shaft 3. By means of the said cam 56, arms 52 and 53, and connections between said arms the cutter-carrying shafts and cutters are operated so as to cause the working ends of the cutters to approach each other from the position that is represented in Fig. 5, so as to sever the wire and afterward to separate to approximately the extent which is shown in the said figures.

The cutters vibrate through short arcs, their working or operative stroke being in the direction of the feed of the wire. As the acting portions thereof make their stroke toward the leading end of the wire the said acting portions move in curved paths which are nearly tangential, but intersect at an acute angle at a point located between the centers of movement of the cutters, the said point being near or approximating a line connecting the said centers. The described arrangement of cutters operates with a rolling action of the latter, such action being powerful and certain in effect, while consuming but little driving power. By reason of the acute angle at which the paths of the acting portions of the cutters intersect and the fact that forward movement of the wire during the cutting operation is prevented by the holding mechanism a comparatively long wedge-shaped point is produced on the end of the wire from which the nail or tack is severed, and correspondingly long oppositely-diverging spurs or burs are produced on the upper end of the said severed nail or tack. As the cutters complete their working stroke the approach of their acting portions to the line connecting the centers of motion of the cutter causes such portions of the cutters to bend or spread the spurs or burs away from each other, thus forming a transversely-expanded head for the nail or tack. The shape of the nail or tack thus formed will be clearly seen in Fig. 13, in which the body of the nail is indicated by A, the spurs or burs by B, and the point by C. The size and shape of the burs B and point C depend upon the size of wire from which the nails are formed, as well as upon the particular path of movement given to the knives when the machine is built. The spurs or burs become still more widely spread apart under the action of driver 20 in being driven.

In order to enable the working ends of the cutters to be brought with precision into proper working relation with respect to each other and to compensate for differences between the two cutters, particularly such as result from the grinding or regrinding thereof, I provide for effecting angular adjustment of the cutters relatively to each other and also for effecting adjustment of the cutter-carrying shafts bodily with relation to each other—for example, toward and from the middle line of the path of the wire. I prefer to effect the said angular adjustment by a device applied to the connections by means of which the cutter-carrying shafts are actuated in unison with each other. In the present case I construct the pin 55, which connects the block 54 to the arm 53, with one portion thereof—namely, the portion thereof which enters the hole that is provided for its reception in such block—eccentric with relation to the other portion thereof—namely, the portion thereof which enters the hole or socket that is provided in the said arm 53 for its reception. By rotating the said pin in the said socket in the arm 53 the cutter-carrying shaft 50, on which the slotted arm 52 is mounted, will be turned partially upon its axis, whereby the required angular adjustment of the cutter of such shaft relatively to the cutter of the other cutter-carrying shaft is effected. In connection with eccentric pin 55 I provide means for preventing accidental or undesired rotation of the said pin in its socket. To this end I have in the present instance made a slit or slot in the arm 53 leading into the socket, as at 565, Figs. 6 and 7, thus converting the said socket into a split one, and I provide a screw 561, whereby to clamp the sides of the socket upon the pin after the adjustment thereof. To facilitate the turning of the eccentric pin 55 in making the described adjustment thereof, I have shown a hole 566 therein for the reception of a pin or the like device.

For the purpose of effecting adjustment of the cutter-carrying shafts bodily I mount each thereof in an eccentrically-bored bearing-sleeve, as 57, having a cylindrical exterior and fitting a cylindrical socket in the framework 1. Each of these sockets is split, as at 58, and provided with one or more clamping-screws, as at 59, whereby to enable the socket to be tightened upon the bearing which is located therein after the required rotary adjustment of the bearing within its socket has been effected. To facilitate the turning of the bearings 57 57 within their sockets, each of the said bearings is or may be provided with a projecting pin 60, Figs. 1 and 5, constituting a handle or other known device.

After the nail or tack has been severed from the advance end of the continuous wire 5 it occupies a position in the slot 11 of the plate 61, the nail or tack at such moment being immediately at the rear of the pusher 18, which works in the said slot. To the said pusher is communicated a movement from front to rear, which enables it to push the said nail or tack rearwardly into the vertical driving-channel 19, Fig. 6.

The pusher 18 has connected therewith a pin 181, Fig. 6, fitting within a hole 182, that is formed in the machine-framing 1 and movable longitudinally in the said hole, a spiral spring 183 being located within the hole also and compressed by the extremity of pin 181. The said spring acts with a tendency to hold the pusher normally to the front, as in Fig. 6, while a side cam 184 on shaft 3 acts against the pusher at the proper moment to occasion the rearward movement of the pusher— namely, to the right-hand side in Fig. 6— whereby the nail or tack is pushed into the driving-channel.

The lower end of the driver 20 plays up and down in the said channel 19 and in its descent forces the nail or tack into the work which is being pressed by the operator upward against the nose of the work-rest 21. The bar or shank 62 of the driver 20 is provided with a head 63, Fig. 1, with which latter is connected pivotally one end of a link 64, having the other end thereof connected pivotally with the actuating-arm 65. The latter is mounted to turn on the pin or stud 37 alongside the arm or lever 29, and to a pin or projection 661, Fig. 2, thereon is connected one end of a spiral spring 66, Fig. 2, encircling the hub of the arm 65 and having its other end connected with a pin 663 on a lever 664, which is pivoted on the pin or stud 37. The said spring acts with a tendency to force the driver 20 downward, and its tension is regulated by effecting adjustment of lever 664, the latter being formed with teeth 665, Fig. 1, that are engaged by a dog or pawl 666, which is mounted on a fixed part of the machine-framing and is pressed into engagement with the said teeth by means of a spring 667.

The head 63 of the driver 20 is provided with a cushion 631, composed of disks of leather or other suitable material, which cushion strikes a fixed portion of the machine-framework 1 to arrest without excessive noise or shock the descent of the driver and the parts which are connected therewith.

The elevation of arm 65 and the driver is effected through the aid of the arm or lever 29. A block or the like (designated 67, see dotted lines, Fig. 1) projects from arm 65 toward arm or lever 29. On the side of the latter next the arm 65 is pivoted a dog 68, Figs. 1 and 9, to engage the said block 67, the said dog having connected therewith a spring 69, Fig. 9, which tends to hold it normally in position to engage with block 67. In the rise of arm or lever 29 the end of the said dog 68 takes under the block 67, and thus carries the arm 65 upward, lifting the driver 20. A tail 70 on the dog 68 is carried in the rise of the arms 29 and 65 into contact with a fixed stop 71, Fig. 1, projecting from pin or stud 37, and thereby as the said arms continue their upward movement the disengagement of dog 68 from block 67 is effected, whereupon the spring 66 occasions immediately the descent of arm 65 and the driver 20. The tubular guide 12 is carried by the driver-head 63.

I claim as my invention—

1. The improved cutting devices comprising cutter-carrying shafts mounted on opposite sides of the path of the wire, cutters carried by the said shafts and engaging the opposite sides of the wire, and means for actuating the said shafts, including intermediate devices to cause the shafts to turn in unison, and also provisions for effecting an angular shift or adjustment of the cutters relatively to each other, substantially as described.

2. The improved cutting devices comprising cutter-carrying shafts mounted on opposite sides of the path of the wire, cutters carried by the said shafts and engaging the opposite sides of the wire, and means for actuating the said shafts, including arms secured to the respective shafts and in pin-and-slot connection with each other, the pin having eccentric portions and also having capacity for rotary adjustment whereby to effect an angular shift or adjustment of the cutters relatively to each other, substantially as described.

3. The clamping devices having a movable jaw, a spring acting on the said jaw with a tendency to hold the same closed, a moving cam or eccentric whereby for part of the time the said jaw is closed positively, and a shaft carrying an eccentrically-disposed pivot on which the said movable jaw is mounted, whereby by making rotary adjustment of the said shaft the relative position of the said movable jaw may be varied as required.

4. The improved tacking-machine comprising the feeding device to advance the wire past the cutters, the clamping devices to hold the wire from undesired movement after it has been fed, the cutting devices, the plate having the nail or tack receiving slot directly in the line of feed and the driving-channel adjacent the same, the transversely-moving pusher working in the said slot and operating to push the nail or tack into the said channel, and the driver, substantially as described.

5. The combination with the feeding device to engage the wire, of a rod in operative connection with the said feeding device and provided with a pin, an actuating-arm constructed to engage the pin in the movement of the arm in one direction, a supplemental piece moving in unison with the said arm and constructed to engage with the said pin in the movement in the other direction, and means to adjust the position of the said supplemental piece with reference to the said arm, whereby to vary at will the amount of lost motion and the extent of the feed, substantially as described.

6. The combination with the feeding device to engage the wire of a rod in operative connection with the said feeding device and provided with a pin, an actuating-arm constructed to engage the pin in the movement of the arm in one direction, a supplemental arm constructed to engage with the said pin in the movement of the arm in the other direction, the said supplemental arm having a gear-segment, and a pinion mounted on the said actuating-arm and engaging with the said gear-segment, whereby to adjust the said supplemental arm in order to vary at will the amount of lost motion and the extent of the feed, substantially as described.

7. The combination with the block 22 having a fixed jaw and a movable jaw, and the lever 26 movably connected with the said block and serving to operate the said movable jaw, of a rod connected with the said lever 26 and provided with a pin, an actuating-arm constructed to engage the pin in the movement of the arm in one direction, a supplemental arm constructed to engage with the said pin in the movement of the arm in the other direction, the said supplemental arm having a gear-segment, and, a pinion mounted on the said actuating-arm and engaging with the said gear-segment, whereby to adjust the said supplemental arm in order to vary at will the amount of lost motion and the extent of the feed, substantially as described.

8. The combination with the block 22 having jaws to engage the wire, the lever 23 on which the said block is mounted, and the lever 26 pivoted to the said block and serving to actuate the movable jaw, of the rod having universal-joint connections with the said lever 26, and an actuating-arm with which the said rod is operatively connected, the said lever 23 and actuating-arm swinging in planes at an angle to each other, substantially as described.

9. The combination with the block 22 having a fixed jaw and a movable jaw, and the lever 26 movably connected with the said block and serving to operate the said movable jaw, of actuating devices connected to the said lever, and a drag device whereby to retard the movement of the said block, substantially as described.

10. The combination with feed-jaws, one of which is movable toward and from the other, a carrier for the said jaws, and a lever movably connected with the said carrier and serving to operate the said movable jaw, of actuating devices connected to the said lever, a pin applied to the said carrier, an adjustable friction device applied to the said pin, and a fixed part which is engaged by the said friction device, substantially as described.

11. The combination with the driver, an arm 65 operatively connected therewith, and a spring to depress the said arm 65, of an actuating-arm carrying a spring-pressed dog to engage with the said arm 65 and cause it to rise in unison with the actuating-arm, and a fixed stop which disengages the dog from the said arm 65 in the course of the movement of the actuating-arm, and allows the spring to depress the same, substantially as described.

12. The combination with the driver, an arm 65 operatively connected therewith and provided with a lateral projection, and a spring to depress the said arm, of an actuating arm carrying a spring-pressed dog to engage with the said projection and cause the arm 65 to rise in unison with the actuating-arm, the said dog having a projecting portion or tail, and a fixed stop or abutment against which the said tail is carried in the movement of the parts and whereby the dog is disengaged from the projection of the arm 65 and the spring is allowed to depress the said arm, substantially as described.

In testimony whereof I affix my signature in presence of two witnesses.

HENRY H. CUMMINGS.

Witnesses:
WM. A. MACLEOD,
WILLIAM A. COPELAND.